US006036204A

United States Patent [19]

Craft et al.

[11] Patent Number: 6,036,204

[45] Date of Patent: Mar. 14, 2000

[54] WHEELED HAMPER WITH PIVOTAL HANDLE

[75] Inventors: Charles W. Craft, Applecreek; Patrick Douglas, Wooster, both of Ohio

[73] Assignee: Rubbermaid Incorporated, Wooster, Ohio

[21] Appl. No.: 09/084,360

[22] Filed: May 22, 1998

[51] Int. Cl.$^{7}$ ....... B62B 1/10

[52] U.S. Cl. ....... 280/47.315; 280/47.26; 220/762

[58] Field of Search ....... 280/33.998, 47.131, 280/47.17, 47.24, 47.26, 47.315, 47.34, 47.371; 220/212.5, 244, 334, 761, 762, 765, 769, 913; 16/114.1, 408, 429

[56] References Cited

U.S. PATENT DOCUMENTS

| | | | |
|---|---|---|---|
| 4,600,113 | 7/1986 | DeMars | 280/47.26 |
| 4,987,639 | 1/1991 | Baiuley et al. | 220/761 |
| 5,213,351 | 5/1993 | Chen | 280/47.26 |
| 5,323,923 | 6/1994 | Schauer | 220/769 |
| 5,445,397 | 8/1995 | Evans | 280/47.26 |
| 5,511,807 | 4/1996 | Snyder | 280/47.26 |
| 5,683,097 | 11/1997 | Fenton et al. | 280/47.26 |
| 5,718,350 | 2/1998 | Williams | 220/761 |
| 5,803,297 | 9/1998 | Vasquez | 220/212.5 |

FOREIGN PATENT DOCUMENTS

| | | | |
|---|---|---|---|
| 192106 | 11/1956 | Austria | 280/47.26 |
| 464702 | 1/1992 | European Pat. Off. | 280/47.26 |
| 2075436 | 11/1981 | United Kingdom | 280/47.26 |

*Primary Examiner*—J. J. Swann
*Assistant Examiner*—F. B. Vanaman
*Attorney, Agent, or Firm*—Renner, Kenner, Greive, Bobak, Tayor & Weber

[57] ABSTRACT

A hamper (10) includes a body portion (11) having a front wall (15), a rear wall (16) and two side walls (17, 18) all extending upwardly from a bottom surface (14) to form an open top. A cover portion (12) is pivotally mounted to the body portion (11) to close the open top. Wheels (21) are positioned at the bottom of the rear wall (16) to render the hamper (10) mobile. For such purpose, a handle assembly (13) is provided in the form of a U-shaped handle (33) having opposed branches (35) interconnected at one end by a grip area (34). The other end of the branches (35) are pivotally connected to the body portion (11). A bar (40) extends between the branches (35) and carries a pull tab (41) and a lock lug (42). The lock lug (42) is received in a slot (45) formed in the body portion (11) to hold the handle (33) in an upright position so that the hamper (10) can be transported on the wheels (21). If desired to pivot the handle (33) to a stowed position during periods of non-use, the pull tab (40) is merely flexed and the lock lug (42) comes out of the slot (45) so that the handle (33) can be rotated.

11 Claims, 5 Drawing Sheets

WHEELED HAMPER WITH PIVOTAL HANDLE

TECHNICAL FIELD

This invention relates to a clothes hamper. More particularly, this invention relates to a hamper having wheels rendering it mobile and a handle which can be locked in place in an upright position for transporting the hamper or be pivoted to a downward position when not in use.

BACKGROUND ART

Containers having wheels and a handle to assist in transporting the container on its wheels are well known in the art. However, such containers are usually quite large, such as refuse containers utilized for commercial purposes, and require a very sturdy and usually complex handle, particularly if the handle is to have a pivoting characteristic. As such, most light-weight household items, such as a hamper for receiving dirty laundry, have not been rendered mobile, with wheels, and have had no need for a handle.

In the only known hamper-like product having wheels, a pivotable cover is intended to also act as a handle. But such is difficult to use and not at all reliable inasmuch as the cover tends to move on its hinge when being used as a handle and is thus not a practical manner in which to readily render a hamper mobile.

The need exists, therefore, for an economically manufacturable mobile clothes hamper having a handle which can be locked in a use position and readily unlocked and pivoted to a stowed position when not in use.

DISCLOSURE OF THE INVENTION

It is therefore an object of the present invention to provide a hamper with wheels and a handle so that the hamper can be readily transported on the wheels.

It is another object of the present invention to provide a hamper, as above, in which the handle can be locked in an operable position and unlocked and pivoted to a recessed position when not in use.

It is a further object of the present invention to provide a hamper, as above, with a cover which can be pivoted to an open position irrespective of the position of the handle.

It is an additional object of the present invention to provide a hamper, as above, which can be inexpensively manufactured and which is easy to use.

These and other objects of the present invention, as well as the advantages thereof over existing prior art hampers, which will become apparent from the description to follow, are accomplished by the improvements hereinafter described and claimed.

In general, a hamper made in accordance with the present invention includes a body portion having a bottom surface and walls extending upwardly therefrom to form a container with an open top. A handle assembly is pivotally mounted relative to the body portion and carries a lug which can be received in an opening formed in the body portion to hold the handle assembly in one position. A tab is connected to the lug so that upon flexing of the tab, the lug can be moved out of the opening so that the handle assembly can be pivoted to another position.

A preferred exemplary hamper incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
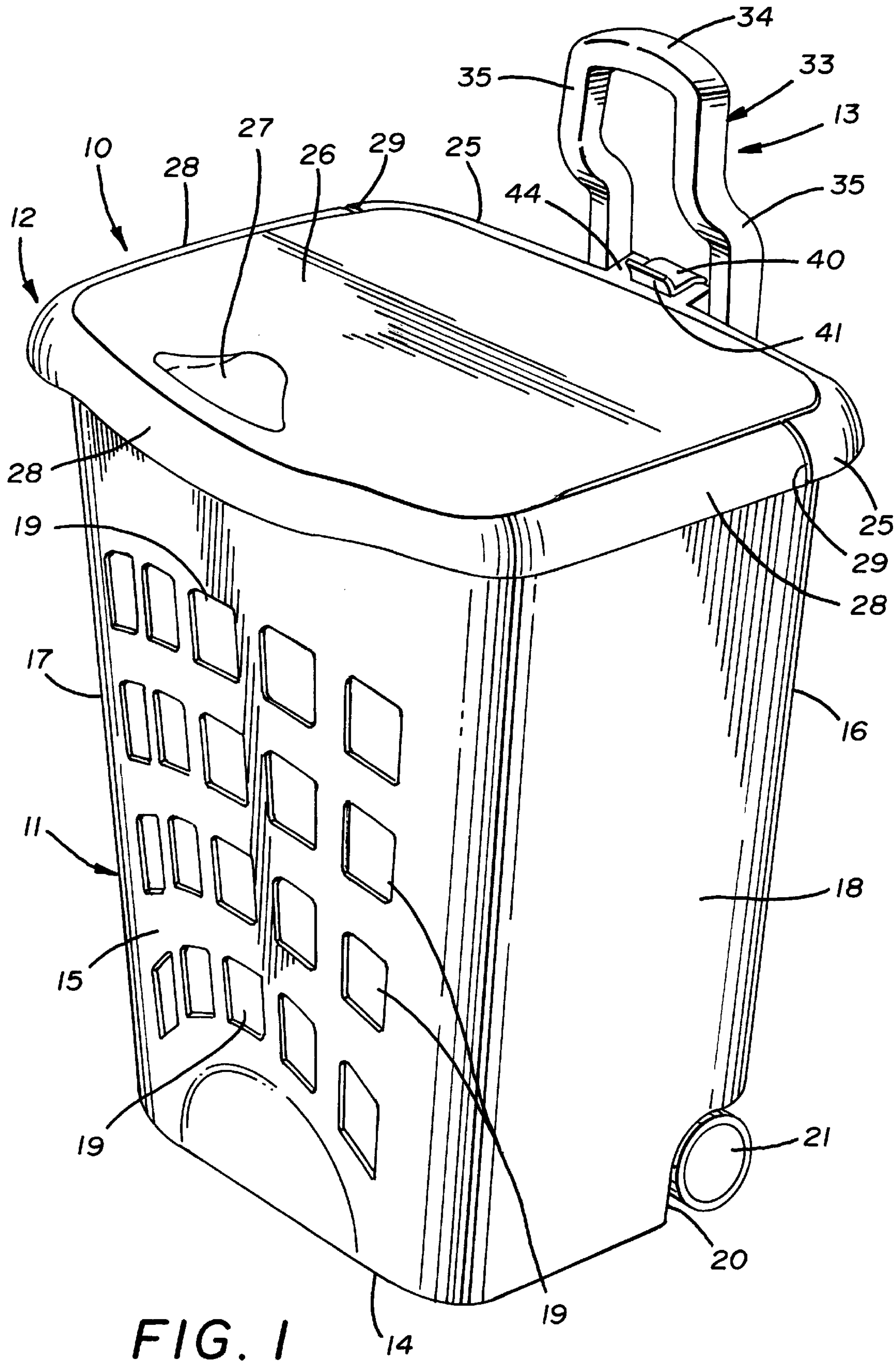
FIG. 1 is a perspective view of a hamper made in accordance with the present invention.
Figure 2:
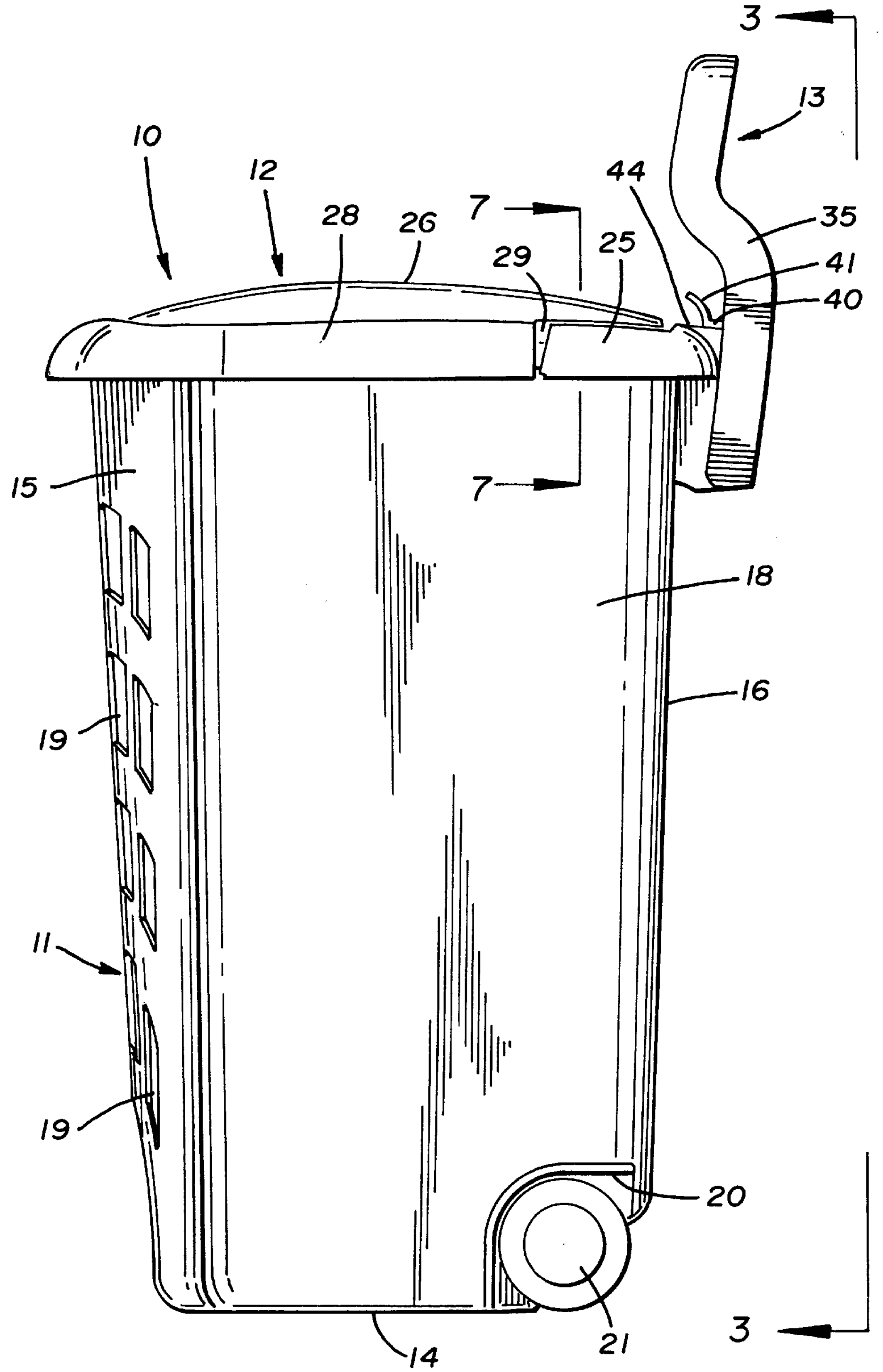
FIG. 2 is a side elevational view of the hamper shown in FIG. 1.
Figure 3:
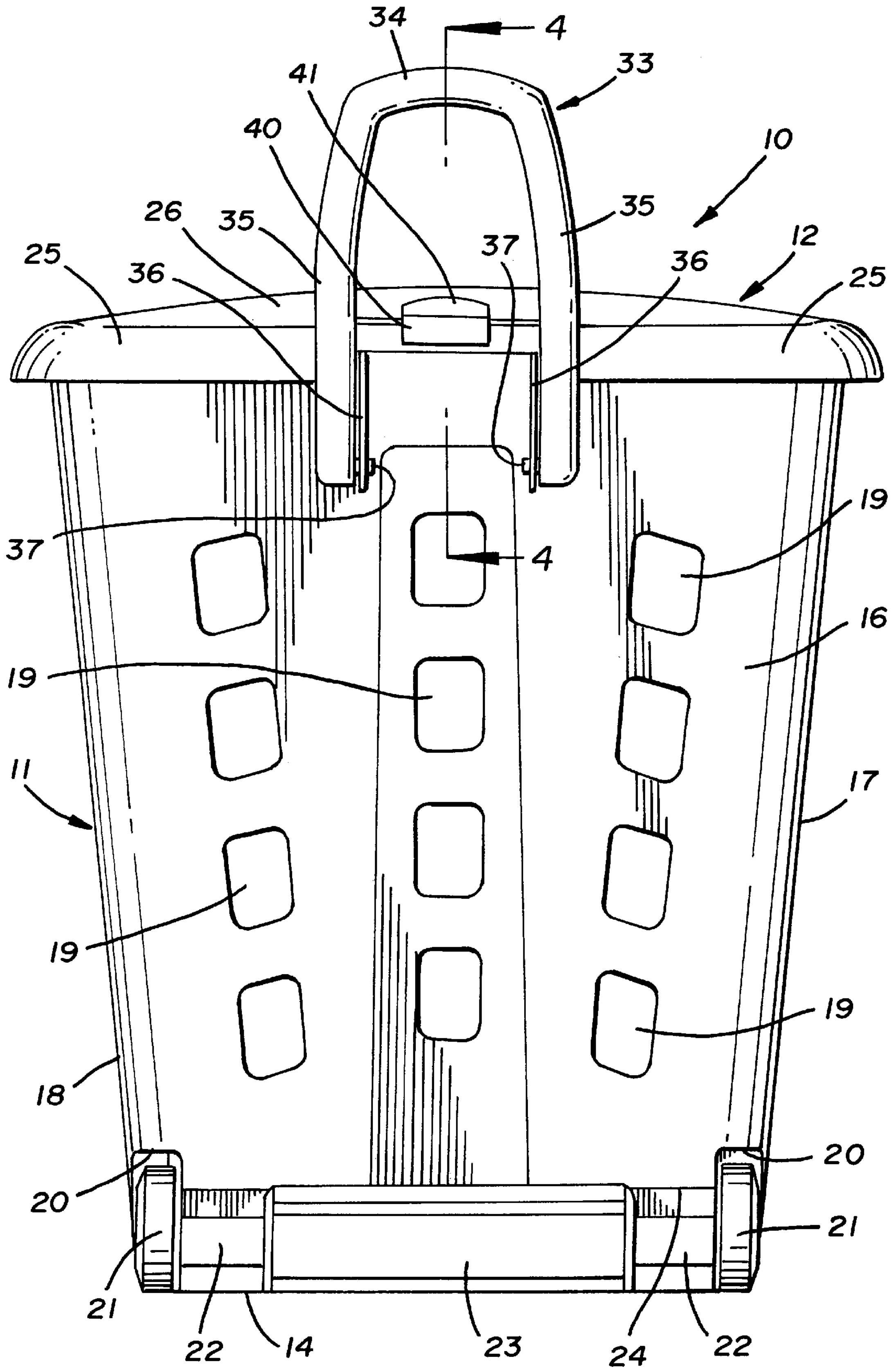
FIG. 3 is a rear elevational view of the hamper shown in FIG. 1 and taken substantially along line 3—3 of FIG. 2.
Figure 4:
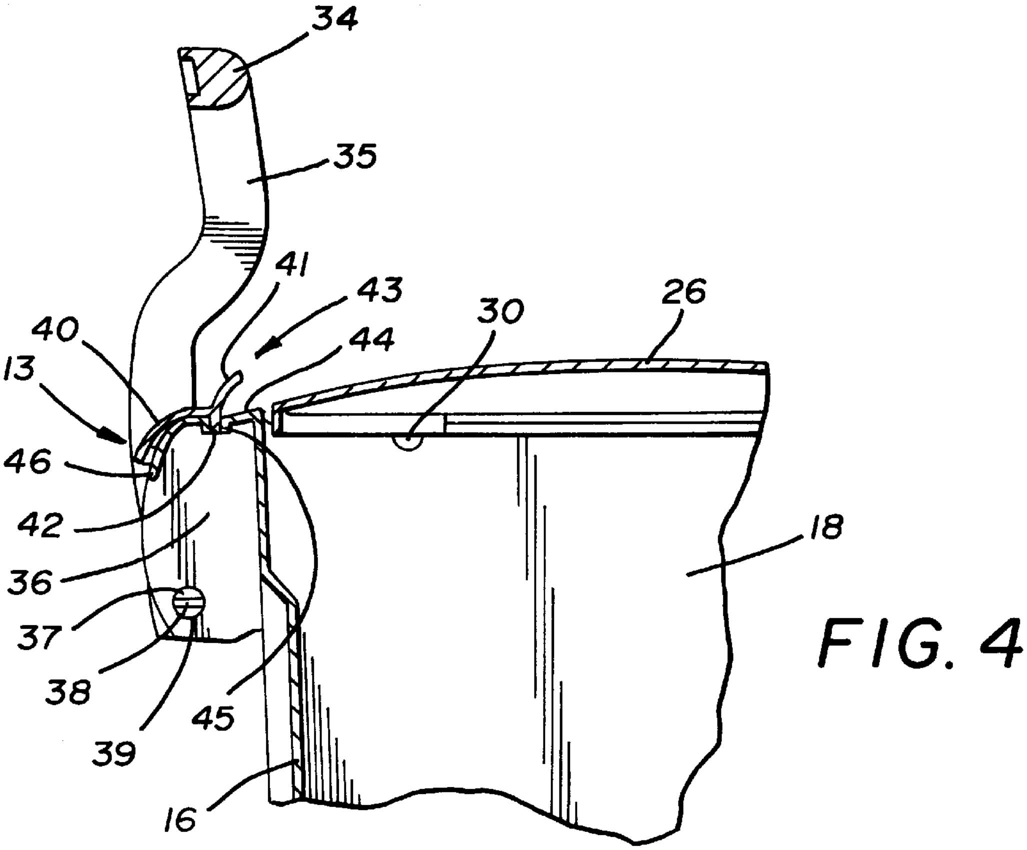
FIG. 4 is a fragmented sectional view taken substantially along line 4—4 of FIG. 3.

A hamper made in accordance with the present invention is indicated generally by the numeral 10 and includes a body portion indicated generally by the numeral 11, a cover portion indicated generally by the numeral 12, and a handle assembly indicated generally by the numeral 13. All such components of hamper 10 may be conveniently molded of any suitable plastic material as would be evident to one skilled in the art.

Body portion 11 includes a bottom surface 14, and a front wall 15 and an opposed rear wall 16 extending upwardly therefrom. Opposed side walls 17, 18 likewise extend upwardly from bottom surface 14 and between front wall 15 and rear wall 16 to thereby form a container having an open top. Front wall 15 and rear wall 16 are shown as having a plurality of breathing apertures 19 formed therein which is a common feature for many hampers.

The corner junction of bottom surface 14, rear wall 16 and each side wall 17, 18 are provided with dished out areas 20 to receive wheels 21 recessed therein. Wheels 21 are rotatably carried by an axle 22 which is carried by a hub 23 positioned in a recess 24 formed in the bottom of rear wall 16. Because wheels 21 are thus received within the profile of bottom surface 14, and because walls 14, 15, 16 and 17 taper outwardly from their bottoms to their tops, body portion 11 can readily be nested within a like body portion for ease of shipment and retail display.

Figure 5:
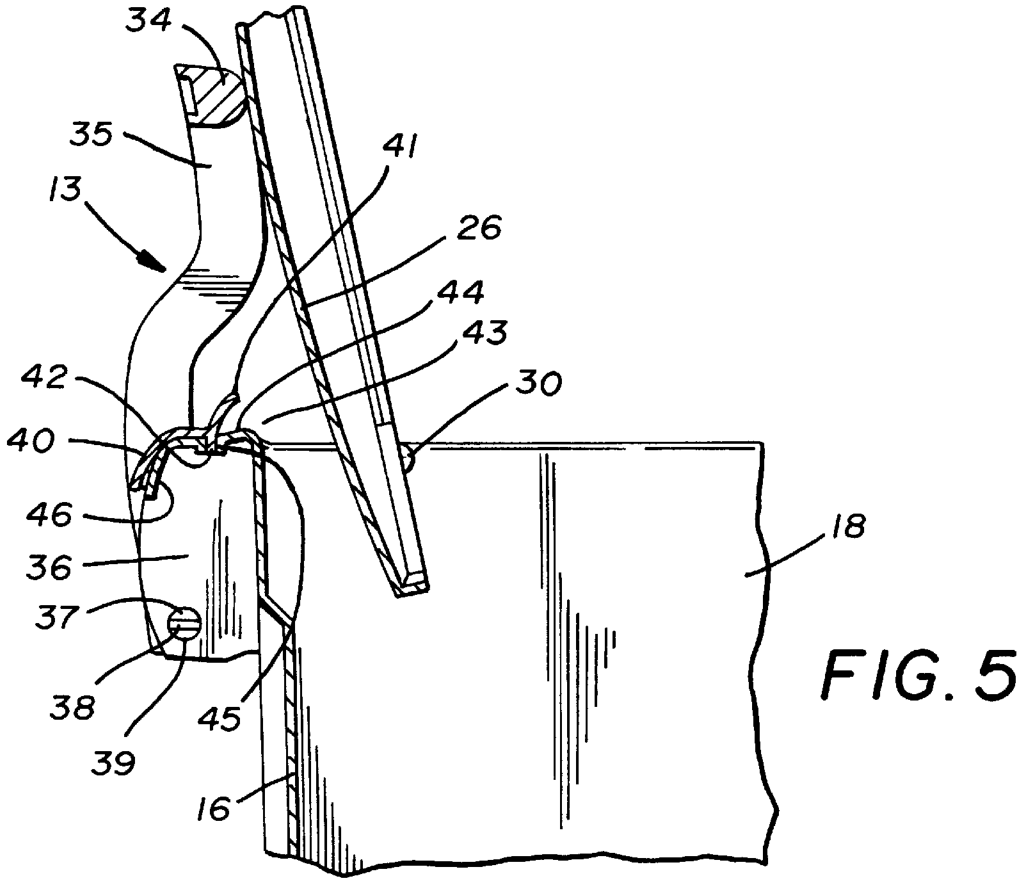
FIG. 5 is a view similar to FIG. 4 but showing the hamper cover in an open position.
Figure 7:
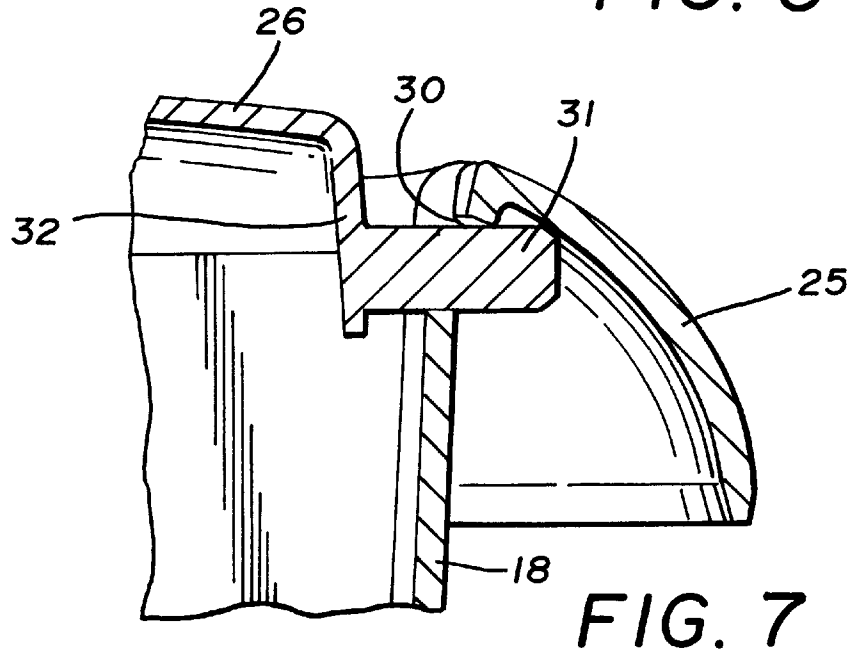
FIG. 7 is a fragmented sectional view taken substantially along line 7—7 of FIG. 2.

The top of rear wall 16 is provided with an arcuate skirt 25 which extends around the top rear corners and slightly above side walls 17 and 18. Cover portion 12 includes a slightly domed lid surface 26 having a bell-shaped gripping recess 27 therein. The majority of the periphery of surface 26 is provided with an arcuate skirt 28 which aesthetically matches skirt 25, with a small notch 29 appearing between skirts 25 and 28. Although not shown in the drawings, base portion 10 may be provided with a smaller skirt of the same profile which is positioned under cover skirt 28 so that skirt 28 may conveniently rest on this smaller skirt. As shown in FIG. 7, near each notch 29, skirt 25 is provided with opposed apertures 30 (one shown) to receive pins 31 (one shown) which extend laterally outwardly from a downwardly directed lip 32 carried by lid surface 26. As such, cover portion 12 can be lifted, most conveniently by grasping recess 27, and rotated on pins 31 to an open position as shown in FIG. 5. In so doing, notch 29 allows skirt 28 to clear skirt 25 without interference.

Handle assembly 13 includes a generally U-shaped handle, generally indicated by the numeral 33, which includes a grip area 34 which interconnects two generally parallel opposed handle branches 35. Spaced rib members 36 extend outwardly from rear wall 16 of body portion 11 and are positioned adjacent to each handle branch 35. Pivot pins 37, having a split 38 in the outer end thereof, are carried near the end of handle branches 35 and may be snapped into apertures 39 formed in rib members 36. In so doing, pins 37 flex at the area of split 38 to allow such an insertion. As such, handle 33 is rotatable relative to base portion 11 on pivot pins 37.

A curved bar 40 extends between handle branches 35 and is formed at one end with a flexible pull tab 41 extending generally in one direction therefrom and a small lock lug 42 extending in generally the other direction therefrom. A platform, generally indicated by the numeral 43, extends outwardly from rear wall 16 of body portion 11 in a location between handle branches 35. Platform 43 includes a generally horizontal upper surface 44 having an opening in the form of a lock slot 45 extending therethrough. The outer end 46 of platform 43 curves downwardly as shown in FIG. 6.

When handle assembly 13 is in its upright position, suitable for use to move hamper 10 on wheels 21, lock lug 42 is positioned in lock slot 45 to maintain handle assembly 13 in such a position. As such, when grip area 34 of handle assembly 13 is grasped and pulled toward the user at the back of hamper 10, hamper 10 will rest on its wheels for ease of transport. Also, as shown in FIG. 5, when handle assembly 13 is in the upright position, cover portion 12 may be rotated to its open position without interference.

Figure 6:
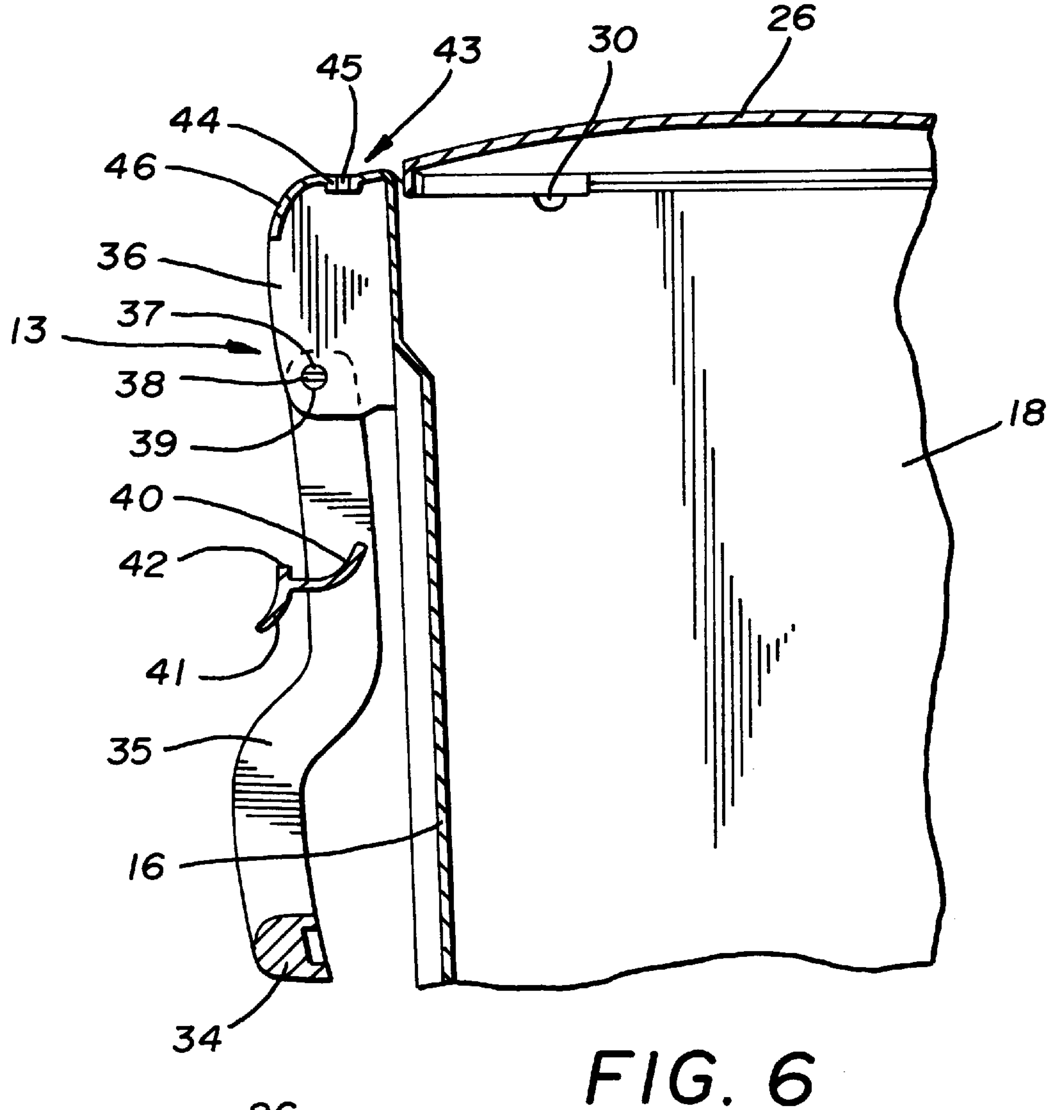
FIG. 6 is a view similar to FIG. 4 but showing the hamper handle unlocked and pivoted downwardly.

If it is desired to position handle assembly 13 behind rear wall 16, as shown in FIG. 6, the user only needs to pull on flexible tab 41 which causes lug 42 to be displaced from lock slot 45 thereby freeing handle 33 for rotation on pins 37. Because curved bar 40 is generally resting on the similarly curved outer end 46 of platform 43, any downward force transmitted from tab 41 to bar 40 will be absorbed by platform 43.

In view of the foregoing, it should thus be evident that a hamper constructed as described herein accomplishes the objects of the invention and otherwise substantially improves the art.

What is claimed is:

1. A hamper comprising a body portion having a bottom surface and walls extending upwardly therefrom to form a container with an open top, a handle assembly including a generally U-shaped handle having a grip area interconnecting two spaced branches, said branches being pivotally mounted relative to said body portion, a bar extending between and connecting said branches, an opening formed in said body portion, a lug carried by said bar and receivable through said opening to hold said handle assembly in one position, and a flexible tab carried by said bar and integrally connected to said lug so that upon flexing of said tab, said lug can be moved out of said opening so that said handle assembly may be pivoted to another position.

2. A hamper according to claim 1 wherein said body portion includes a platform extending outwardly from one of said walls, said platform having said opening therein.

3. A hamper according to claim 2, said bar having a curved surface and said platform having a generally corresponding curved surface engaged by said curved surface of said bar.

4. A hamper according to claim 1, wherein said body portion includes ribs extending outwardly from one of said walls, said handle branches being pivotally attached to said ribs.

5. A hamper according to claim 4 wherein said handle assembly includes pins formed on said handle branches, said pins being received in apertures formed in said ribs.

6. A hamper according to claim 1 wherein said body portion includes wheels rotatably mounted near said bottom surface, and a recess formed in each of two opposed of said walls, a said wheel being positioned in each said recess.

7. A hamper according to claim 1 further comprising a cover portion, said cover portion including a lid to close said open top.

8. A hamper according to claim 7, said lid having a gripping recess formed therein.

9. A hamper according to claim 7, said cover portion being pivotally mounted to said body portion.

10. A hamper according to claim 9, said lid having pins extending outwardly therefrom, said body portion having apertures to receive said pins.

11. A hamper according to claim 9, wherein said body portion includes a skirt extending partially around the periphery of said open top, and said cover portion includes a skirt extending partially around said lid, said skirt of said body portion and said skirt of said cover portion being spaced by a notch but otherwise together extending around the entire periphery of said open top.

* * * * *